US010367755B2

(12) United States Patent
Fadle et al.

(10) Patent No.: US 10,367,755 B2
(45) Date of Patent: Jul. 30, 2019

(54) METHOD FOR MANAGING BANDWIDTH BY A COMMUNICATION NETWORK INTERCONNECTION DEVICE (71) Applicant: SAGEMCOM BROADBAND SAS, Rueil Malmaison (FR)

(72) Inventors: Hatim Fadle, Rueil Malmaison (FR); Anthony Reuche, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 15/748,341

(22) PCT Filed: Jul. 18, 2016

(86) PCT No.: PCT/EP2016/067020
§ 371 (c)(1),
(2) Date: Jan. 29, 2018

(87) PCT Pub. No.: WO2017/021129
PCT Pub. Date: Feb. 9, 2017

(65) Prior Publication Data
US 2018/0219796 A1 Aug. 2, 2018

(30) Foreign Application Priority Data

Jul. 31, 2015 (FR) ..................... 15 57419

(51) Int. Cl.
*H04L 12/927* (2013.01)
*H04L 12/917* (2013.01)
(Continued)

(52) U.S. Cl.
CPC ........ *H04L 47/801* (2013.01); *H04L 43/0888* (2013.01); *H04L 47/24* (2013.01); *H04L 47/76* (2013.01)

(58) Field of Classification Search
None
See application file for complete search history.

(56) References Cited

U.S. PATENT DOCUMENTS 7,257,632 B2 *  8/2007  Zhang ................ H04L 41/0896
                                                  709/226
7,483,380 B2 *  1/2009  Metke .................... H04L 45/02
                                                  370/237
(Continued)

FOREIGN PATENT DOCUMENTS

EP        2 573 997 A1      3/2013

OTHER PUBLICATIONS

Sep. 15, 2016 Search Report issued in International Patent Application No. PCT/EP2016/067020.
(Continued)

*Primary Examiner* — Anh Ngoc M Nguyen
(74) *Attorney, Agent, or Firm* — Oliff PLC; R. Brian Drozd (57) ABSTRACT An interconnection device for interconnecting between first and second networks, between which there pass critical data streams having a bandwidth reservation requirement in order to ensure rate and latency constraints, performs, for each critical data stream, the interconnection device: measuring an effective rate of said critical data stream; checking whether said measured effective rate is greater than the sum of a previously reserved bandwidth and a tolerance bandwidth; checking whether said measured effective rate is lower than the previously reserved bandwidth, from which the sum of a margin bandwidth and tolerance bandwidth is deducted; and in the event of positive check, adjusting bandwidth reservation for said critical data stream to a value equal to the sum of the measured effective rate for said critical data stream and the margin bandwidth.

9 Claims, 3 Drawing Sheets (51) Int. Cl.
*H04L 12/26* (2006.01)
*H04L 12/851* (2013.01)

(56) References Cited

U.S. PATENT DOCUMENTS

| | | |
|---|---|---|
| 2010/0094989 A1 | 4/2010 | Li et al. |
| 2013/0100803 A1* | 4/2013 | Menchaca ........... H04L 47/2475 370/230 |
| 2013/0275578 A1 | 10/2013 | Williams et al. |

OTHER PUBLICATIONS

Kofler et al; "Improving IPTV Services by H264/SVC Adaptation and Traffic Control;" IEEE International Symposium on Broadband Multimedia System and Broadcasting; 2009; XP031480123; pp. 1-6.

* cited by examiner

METHOD FOR MANAGING BANDWIDTH BY A COMMUNICATION NETWORK INTERCONNECTION DEVICE

The present invention relates to dynamically adapting bandwidth reservation for data streams passing between first and second communication networks via an interconnection device.

Among interconnection devices for interconnecting first and second communication networks, one finds equipment of residential gateway type. Such equipment enables interconnecting a first network of LAN (Local Area Network) or WLAN (Wireless LAN) type to a second communication network of WAN (Wide-Area Network) type in order in particular to enable communication devices connected to the LAN or WLAN to access the Internet, to receive or send telephone calls, or to receive TV over IP (Internet Protocol, as defined in the standard document RFC 791). In the context of implementations of services, data streams pass between the first and second communication networks, via the interconnection device. These data streams are typically categorised according to the service with which said data streams are associated. To each type (or category) of data stream, there corresponds flow rate and/or latency constraints that it is advisable to comply with, according to the quality of service (QoS) required for the service with which the data stream in question is associated.

Changes in technologies favouring rate increases are completely separate between WAN and LAN communication networks. Indeed, currently the increase in LAN communication networks capacities is much greater than the increase in WAN communication networks capacities. In addition, it has to be noted that residential gateways connectivity on LAN side increases rapidly (for example: Gigabit Ethernet, Wi-Fi, Bluetooth, etc.) whereas connectivity on WAN side changes less quickly. Thus the need to regulate and manage the various data streams that pass via the interconnection device is of most importance. The entire challenge of current systems is therefore to be able to offer a maximum useful rate on LAN side while complying with the service constraints in terms of rate and latency on WAN side. For this purpose it is advisable to propose a useful rate on WAN side as close as possible to the physical rate, which means avoiding unnecessary bandwidth reservations that impair good management of admission control.

Such a situation is obvious with regard to residential gateways, but is also encountered in other communication network interconnection devices.

It is desirable to overcome these drawbacks of the prior art. It is thus desirable to provide a solution that allows improving the management of reservation of bandwidth for data streams passing between a first communication network and a second communication network interconnected via an interconnection device. It is also desirable to provide a solution that is autonomous. It is also desirable to provide a solution that consumes low processing resources (and consequently that consumes low energy resources).

The invention relates to a bandwidth management method implemented by an interconnection device for interconnecting between a first communication network and a second communication network, critical data streams and non-critical data streams passing between the first and second communication networks via said interconnection device, the critical data streams having, unlike the non-critical data streams, a bandwidth reservation requirement in order to ensure rate and latency constraints. Said method is such that the interconnection device implements a monitoring mechanism for monitoring the critical data streams passing between the first and second communication networks via said interconnection device so that, for each critical data stream passing between the first and second communication networks via said interconnection device, said interconnection device performs the following steps: measuring an effective rate of said critical data stream; performing a first check consisting of checking whether said measured effective rate is higher than the sum of a bandwidth previously reserved for said critical data stream and a tolerance bandwidth; performing a second check consisting of checking whether said measured effective rate is lower than the bandwidth previously reserved for said critical data stream, from which the sum of a margin bandwidth and a tolerance bandwidth is deducted; and, in the event of a first positive check or a second positive check, adjusting the bandwidth reservation for said critical data stream to a value equal to the sum of the measured effective rate for said critical data stream and the margin bandwidth.

According to a particular embodiment, the bandwidth reservation for said critical data stream is adjusted within the limit of a maximum bound associated with said critical data stream. Thus it is ensured that the bandwidth reservation for said data stream remains within an acceptable limit vis-à-vis the other data streams that pass via said interconnection device.

According to a particular embodiment, said interconnection device activates said monitoring mechanism, for all said critical data streams passing between the first and second communication networks via said interconnection device, periodically. Thus less processing resources are used by the monitoring mechanism.

According to a particular embodiment, said interconnection device defines dynamically, for each critical data stream passing between the first and second communication networks via the interconnection device, a period of time between two successive activations of the monitoring mechanism by performing the following steps: checking if a criterion of stability of the effective rate of said critical data stream is complied with; in the event of a positive check vis-à-vis said stability criterion, increasing the period of time between two successive activations of the monitoring mechanism for said critical data stream; and, in the event of negative check vis-à-vis said stability criterion, decreasing the period of time between two successive activations of the monitoring mechanism for said critical data stream. Thus a trade-off between reduction in consumption of processing resources and reactivity of the monitoring mechanism is found.

According to a particular embodiment, in the event of negative check vis-à-vis said stability criterion, said period of time between two successive activations of the monitoring mechanism for said critical data stream is reinitialised to a predefined minimum bound. Thus reactivity of the monitoring mechanism is increased.

According to a particular embodiment, said stability criterion is complied with when each measurement of effective rate of said critical data stream during the last N executions, N≥1, is less than the reserved bandwidth, provided that said reserved bandwidth has not been adjusted during said previous N executions of the monitoring mechanism for said critical data stream. Thus, as long as the bandwidth reservation is adequate, the reduction in consumption of processing resources is increased.

According to a particular embodiment, said stability criterion is met when said reserved bandwidth has not been adjusted during said last N executions, N≥1, of the monitoring mechanism for said critical data stream. Thus checking the stability criterion is simple.

The invention also relates to an interconnection device for interonnecting between a first communication network and a second communication network, for critical data streams and non-critical data streams passing between the first and second communication networks via said interconnection device, the critical data streams having, unlike the non-critical data streams, a bandwidth reservation requirement in order to ensure rate and latency constraints. Said method is such that the interconnection device implements a mechanism for monitoring the critical data streams passing between the first and second communication networks via said interconnection device so that, for each critical data stream passing between the first and second communication networks via said interconnection device, said interconnection device implements: means for measuring an effective rate of said critical data stream; means for performing a first check consisting of checking whether said measured effective rate is higher than the sum of a bandwidth previously reserved for said critical data stream and a tolerance bandwidth; means for performing a second check consisting of checking whether said measured effective rate is lower than the bandwidth previously reserved for said critical data stream, from which the sum of a margin bandwidth and a tolerance bandwidth is deducted; and means, in the event of a first positive check or a second positive check, for adjusting the bandwidth reservation for said critical data stream to a value equal to the sum of the measured effective rate for said critical data stream and the margin bandwidth.

The invention also relates to a computer program, which can be stored on a medium and/or downloaded from a communication network, in order to be read by a processor. This computer program comprises instructions for implementing the method mentioned above according to any of the variants thereof, when said program is executed by the processor. The invention also relates to storage means comprising such a computer program.

The features of the invention mentioned above, as well as others, will emerge more clearly from a reading of the following description of an example embodiment, said description being given in relation to the accompanying drawings, among which.

Figure 1:
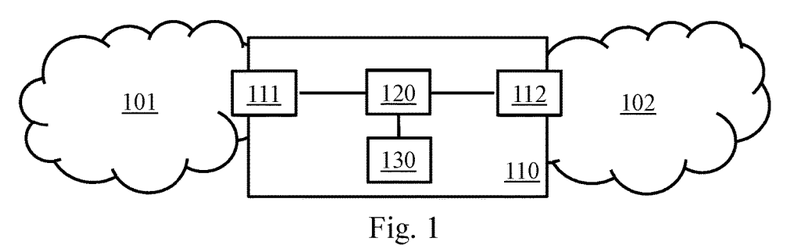
FIG. 1 illustrates schematically a communication system in which the present invention may be implemented.

FIG. 1 illustrates schematically a communication system in which the present invention may be implemented. The communication system in FIG. 1 comprises a first communication network 101 and a second communication network 102 interconnected by an interconnection device 110. Each of the first 101 and second 102 communication networks comprises at least one communication device (not shown). Exchanges in the form of data streams can be established between communication devices in the first communication network 101. Exchanges in the form of data streams can thus be established between communication devices in the second communication network 102. Finally, exchanges in the form of data streams can thus be established between communication devices in the first communication network 101 and communication devices in the second communication network 102 and, in this case, via the interconnection device 110. The invention aims particularly at managing bandwidth reservation for these data streams passing via the interconnection device 110.

"Band reservation" means a reservation of bandwidth in the first communication network 101 and/or a reservation of bandwidth in the second communication network 102 and/or a reservation of bandwidth in the interconnection device 110 (buffers sharing). It shall be understood that this bandwidth reservation is an indication for good management of admission control, namely accepting or refusing new data streams in the light of a current state of occupation of the resources, knowing that critical data streams may exceed the reservations made, at the risk of disturbing the functioning of the communication system, since, if new data streams are accepted in the light of the current reservation of bandwidth whereas the existing data streams are consuming more bandwidth than what is reserved, this may cause network overload and packet and thus cause service degradation.

In a particular embodiment, the first communication network 101 is of LAN or WLAN type, and the second communication network 102 is of WAN type, and the interconnection device 110 is a residential gateway. The interconnection device 110 may interconnect other types of communication network, such as a LAN and a WLAN.

The data streams passing in the first communication network 101, like those passing in the second communication network 102 and like those passing between the first communication network 101 and the second communication network 102 via the interconnection device 110, may be of various types, according to applications from or for which said data streams are originated and/or are destined. Indeed some data streams must comply with constraints of transmission latency and rate, and are therefore critical in terms of management of bandwidth reserved for them. Non-compliance with these constraints typically causes packet losses. Other data streams do not have such latency and rate constraints and may consequently dispense with bandwidth reservation. These other data streams are then transmitted as quickly as possible according to the bandwidth effectively left free by the streams for which bandwidth has been reserved, while avoiding packet losses. A deep packet inspection (DPI) of the data streams enables determining, in particular according to the transport protocols in use, which are the respective types of said data streams.

The data streams passing between the first communication network 101 and the second communication network 102 via the interconnection device 110 are preferably to the IP format.

When the interconnection device 110 is a residential gateway, there is a coexistence of three services: a Voice over IP (VoIP) service, which is considered to be critical vis-à-vis latency and transmission constraints to be met for correct functioning of the service; an IPTV service, which is also considered to be critical vis-à-vis latency and rate constraints to be met for correct functioning of the service; and a data service, which is considered to be non-critical, since it has no latency and rate constraints.

As detailed hereinafter, the interconnection device 110 is adapted for monitoring the various data streams passing between a first interface 111 of said interconnection device 110, via which said interconnection device 110 is connected to the first communication network 101, and a second interface 112 of said interconnection device 110, via which said interconnection device 110 is connected to the second communication network 102. This monitoring consists of determining, for the critical data streams, the respective effective rates of said data streams, and checking adequacy of the respective bandwidths reserved for said data streams, and if necessary adjusting the bandwidth reservations, in real time. To do this, the interconnection device 110 has a depth packet inspection DPI unit 120 placed on the data path between the first 111 and second 112 interfaces. The depth packet inspection DPI unit 120 is also connected to a control unit 130 of the interconnection device 110, responsible in particular for dynamically managing the bandwidth reservations for the critical data streams. The behaviour of the interconnection device 110, and more particularly of the control unit 130, vis-à-vis the bandwidth reservations is described hereafter with respect to FIGS. 3, 4 and 6.

Figure 2:
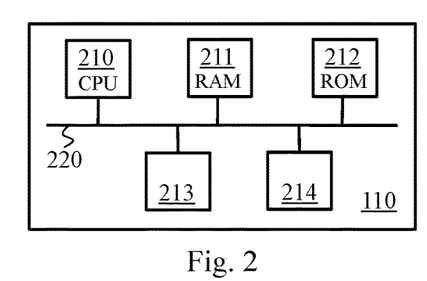
FIG. 2 illustrates schematically an example of hardware architecture of an interconnection device for interconnecting first and second communication networks of the communication system of FIG. 1.

FIG. 2 illustrates schematically an example of hardware architecture of the interconnection device 110.

According to this example of hardware architecture, the interconnection device 110 comprises, connected by a communication bus 220: a processor or CPU (Central Processing Unit) 210; a random access memory (RAM) 211; a read only memory (ROM) 212; a storage unit 213 or a storage medium reader, such as a hard disk drive (HDD) or an SD (Secure Digital) card reader; and a set of interfaces 214 enabling said communication device to be connected to the first 101 and second 102 communication networks (namely respectively the first 111 and second 112 interfaces of the schematic representation in FIG. 1).

The processor 210 is capable of executing instructions loaded into RAM 211 from ROM 212, from an external memory (not shown), from a storage medium, or from a communication network. When the interconnection device 110 is powered up, the processor 210 is capable of reading instructions from RAM 211 and executing them. These instructions form a computer program causing implementation, by the processor 210, of all or some of the algorithms and steps described below.

Thus all or some of the algorithms and steps described below (and therefore the units, of the interconnection device 110, mentioned with regard to FIG. 1) may be implemented in software form by execution of a set of instructions by a programmable machine, such as a DSP (digital signal processor) or a microcontroller. All or some of the algorithms and steps described below may also be implemented in hardware form by a machine or a dedicated component, such as an FPGA (Field-Programmable Gate Array) or an ASIC (Application-Specific Integrated Circuit).

Figure 3:
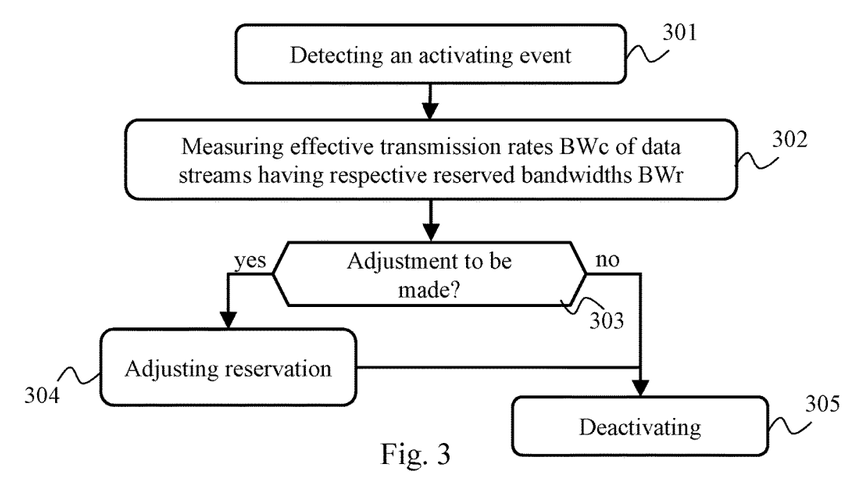
FIG. 3 illustrates schematically an algorithm, implemented by the interconnection device, for dynamically managing bandwidth reservations for data streams passing between the first and second communication networks via said interconnection device.

FIG. 3 illustrates schematically an algorithm, implemented by the interconnection device 110, for dynamically managing bandwidth reservations for data streams passing between the first 101 and second 102 communication networks via said interconnection device 110.

In a step 301, the interconnection device 110 detects an event activating a monitoring mechanism for monitoring the data streams passing between the first 101 and second 102 communication networks via said interconnection device 110. According to a first embodiment, the monitoring mechanism for monitoring said data streams is activated periodically. According to a second particular embodiment, the monitoring mechanism for monitoring said data streams is activated by relying on a period of time between two successive activations, the duration of which is adjusted dynamically, as detailed hereinafter with respect to FIG. 6.

In a following step 302, the interconnection device 110 performs measurements of effective rate of each of the critical data streams that pass between the first 101 and second 102 communication networks via said interconnection device 110.

The interconnection device 110 may be informed of the critical data streams, which pass between the first 101 and second 102 communication networks via said interconnection device 110, to be taken into account, by prior configuration, e.g. thanks to information entered by a user via a control user interface of said interconnection device 110. In a variant, the interconnection device 110 may be informed of the critical data streams that pass between the first 101 and second 102 communication networks via said interconnection device 110, to be taken into account, by analysing exchanges of messages that pass between the first 101 and second 102 communication networks via said interconnection device 110 for establishing said critical data streams. Indeed such critical data streams are typically based on a prior protocol for linking and configuring the concerned terminal devices. Analysing said messages by depth packet inspection (DPI) enables identifying the subsequent critical data streams. A similar procedure is also typically implemented for ending the data streams. Also in a variant, the interconnection device 110 may be informed of the critical data streams that pass between the first 101 and second 102 communication networks via said interconnection device 110, to be taken into account, by directly analysing the data streams that pass between the first 101 and second 102 communication networks via said interconnection device 110. Analysing said data streams by depth packet inspection (DPI) enables distinguishing the critical data streams from the other (non-critical) data streams. It is the latter approach that is used, by way of illustration, hereinafter.

In order to make effective rate measurements of each of the critical data streams, the interconnection device 110 shall be able to distinguish the critical data streams among all the data streams that pass via the interconnection device 110. This is done by depth packet inspection (DPI) of the packets that pass via the interconnection device 110. In this case, the analysis is less expensive in terms of processing resources than for discovering critical data streams not previously identified, since it may suffice here to recover source and destination IP addresses, as well as source and destination ports, to identify the data stream in question.

In a following step 303, the interconnection device 110 checks whether a bandwidth reservation adjustment shall be made vis-à-vis at least one of said critical data streams. When bandwidth has been previously reserved for the critical data stream in question, the interconnection device 110 checks whether the bandwidth reservation is still adequate, or even necessary, according to the effective rate measured for said critical data stream. When no bandwidth has been previously reserved for the critical data stream in question, the interconnection device 110 shall make bandwidth reservation according to the measured effective rate for said critical data stream. As detailed hereinafter with respect to FIG. 4 in a particular embodiment, the interconnection device 110 checks whether the effective rate measured for said critical data stream (denoted BWc) is greater than the sum of the previously reserved bandwidth (denoted BWr) for said critical data stream and a tolerance bandwidth (denoted BWt); if such is the case, a bandwidth reservation adjustment (increase) must be made for said critical data stream, and a step 304 is performed. In addition, the interconnection device 110 checks whether the effective rate (and therefore denoted BWc) measured for said critical data stream is less than the bandwidth previously reserved (and therefore denoted BWr) for said critical data stream from which the sum of a margin bandwidth (denoted BWm) and the tolerance bandwidth (and therefore denoted BWt) is deducted; if such is the case, a bandwidth reservation adjustment (decrease) shall be made for said critical data stream, and the step 304 is performed. In any other case, no bandwidth adjustment is necessary, and a step 305 is performed, in which the monitoring mechanism for monitoring the data streams passing between the first 101 and second 102 communication networks via said interconnection device 110 is deactivated.

The margin bandwidth BWm serves to guard against sporadic upward variations in the effective rate BWc of the considered critical data stream. The margin bandwidth BWm may be predefined, for example according to the type of service with which the critical data stream is associated. The margin bandwidth BWm may also be a predefined percentage of the effective rate BWc of said critical data stream.

The tolerance bandwidth BWt serves to trigger adjustment of the bandwidth reserved for said considered critical data stream. The tolerance bandwidth BWt may be predefined, for example according to the type of service with which the critical data stream is associated. The tolerance bandwidth BWt may also be a predefined percentage of the effective rate BWc of said critical data stream.

In step 304, the interconnection device 110 proceeds with a bandwidth reservation adjustment for each of the critical data streams for which the effective rate measurement made at the step 302 has shown that the previous bandwidth reservation is no longer adequate. As detailed hereinafter with respect to FIG. 4 in a particular embodiment, the interconnection device 110 makes a bandwidth reservation equal to the sum of the effective rate (and therefore denoted BWc) measured for said critical data stream and the margin bandwidth (denoted BWm), unless the critical data stream for which a bandwidth reservation had previously been made no longer exists, in which case the interconnection device 110 releases the bandwidth reserved until then for said critical data stream. Then the step 305 is performed.

Figure 4:
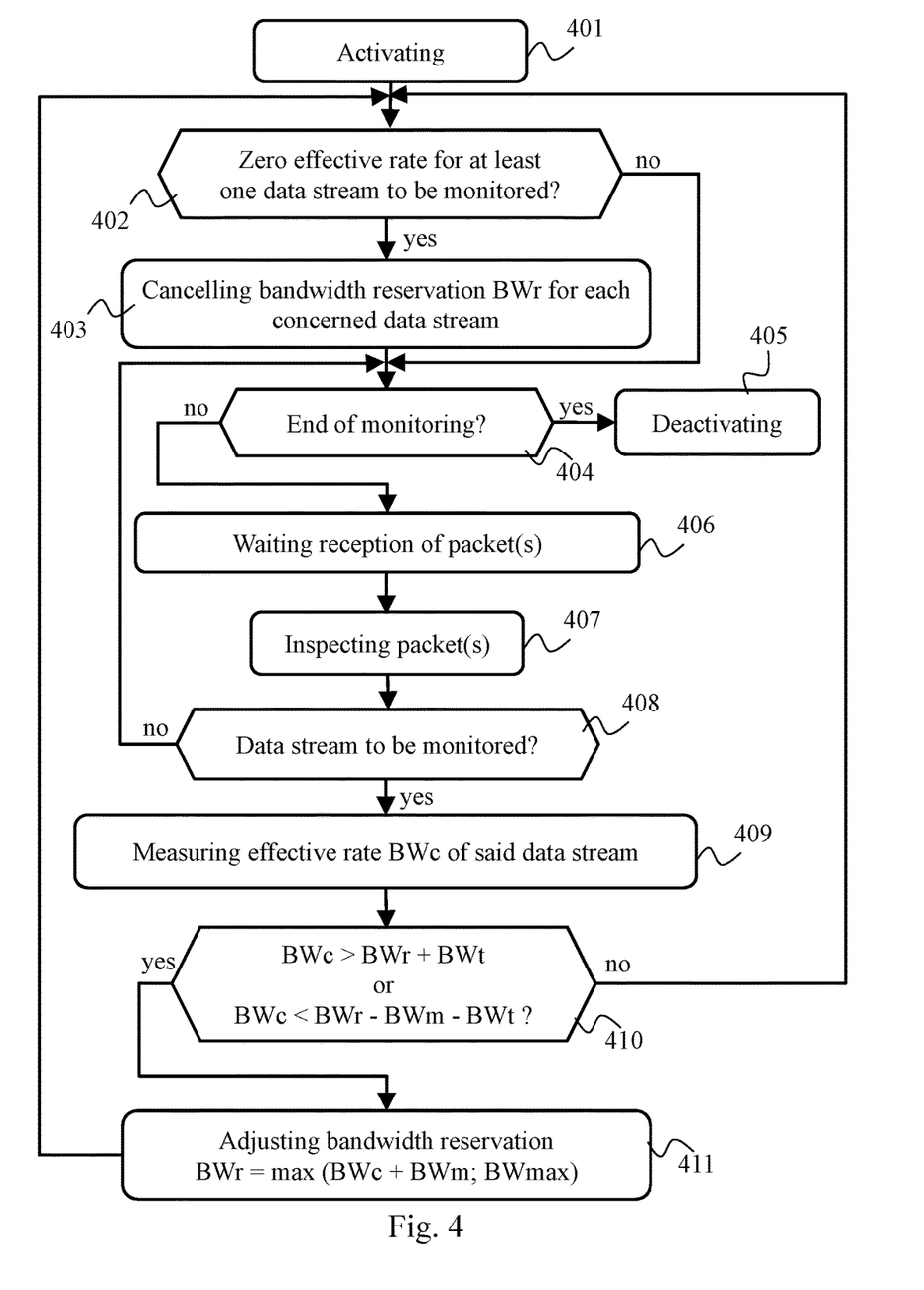
FIG. 4 illustrates schematically an algorithm, implemented by the interconnection device, for dynamically managing said bandwidth reservations, in a particular embodiment of the present invention.

FIG. 4 illustrates schematically an algorithm, implemented by the interconnection device 110, for dynamically managing the bandwidth reservations for the critical data streams passing via said interconnection device 110, in a particular embodiment of the present invention.

In a step 401, the interconnection device 110 activates the monitoring mechanism for monitoring the data streams passing between the first 101 and second 102 communication networks via said interconnection device 110. This step is typically triggered like the previously described step 301.

In a following step 402, the interconnection device 110 checks whether at least one critical data stream, which is therefore to be monitored, has a null effective rate. For example, such information may have been supplied to the monitoring mechanism following the detection, by depth packet inspection (DPI), that messages closing said critical data stream have been exchanged between a device in the first communication network 101 and a device in the second communication network 102. Otherwise, as will be apparent hereinafter, the algorithm in FIG. 4 typically comprises a plurality of loops, and this step 402 enables managing the critical data streams that disappeared during monitoring. If at least one critical data stream has a null effective rate, a step 403 is performed; otherwise a step 404 is performed.

In the step 403, the interconnection device 110 cancels the bandwidth reservation BWr that had previously been made for each critical data stream having a null effective rate BWc. In a preferred embodiment, a minimum bandwidth reservation equal to the margin bandwidth BWm is preserved for each critical data stream likely to pass via the interconnection device 110. This allows ensuring that not the whole bandwidth is consumed by non-critical data streams, which could prevent a correct adoption of critical data streams activated or reactivated subsequently. In other words, the interconnection device 110, within the limit defined by system specifications, releases the bandwidth BWr that had previously been reserved for each critical data stream having a null effective rate BWc. Then the step 404 is performed.

In the step 404, the interconnection device 110 checks whether the monitoring has ended. Indeed the monitoring mechanism is preferably not activated permanently, so as to limit consumption of processing resources of the interconnection device 110. The monitoring is therefore typically activated intermittently during time periods of predefined duration. If the monitoring has ended, a step 405 is performed, in which the monitoring mechanism for monitoring the data streams passing between the first 101 and second 102 communication networks via the interconnection device 110 is deactivated, as for the step 305; otherwise a step 406 is performed.

In the step 406, the interconnection device 110 awaits receiving a packet or packets via one or other of the first 101 and second 102 communication networks. A watchdog mechanism may be implemented in order to prevent the algorithm in FIG. 4 locking up in this step, which would mean any critical data stream would no longer pass via the interconnection device 110.

In a following step 407, the interconnection device 110 performs a depth packet inspection (DPI) so as to identify to which data stream the received data packet(s) belong(s), more particularly whether the received data packet(s) belong(s) to a critical data stream.

In a following step 408, the interconnection device 110 checks whether the received data packet(s) received belong(s) to a critical data stream, and therefore to a data stream to be monitored. If such is the case, a step 409 is performed; otherwise the step 404 is reiterated.

In the step 409, the interconnection device 110 measures the effective rate BWc of said critical data stream to which the received data packet(s) belong(s).

In a following step 410, the interconnection device 110 checks whether the previously reserved bandwidth BWr, for said critical data stream, is still adequate vis-à-vis the effective rate BWc of said critical data stream. The interconnection device 110 checks whether the measured effective rate BWc for said critical data stream is greater than the sum of the bandwidth BWr previously reserved for said critical data stream and the tolerance bandwidth BWt; if such is the case, a bandwidth reservation adjustment (increase) must be made for said critical data stream, and a step 411 is performed. In addition, the interconnection device 110 checks whether the effective rate BWc measured for said critical data stream BWc is lower than the bandwidth BWr previously reserved for said critical data stream, from which the sum of the margin bandwidth BWn and tolerance bandwidth BWt is deducted; if such is the case, a bandwidth reservation adjustment (decrease) shall be made for said data stream, and the step 411 is performed. In every other case, no adjustment is necessary vis-à-vis said critical data stream, and the step 402 is reiterated.

In the step 411, the interconnection device 110 proceeds with a bandwidth reservation adjustment for each of the critical data streams for which the effective rate measurement made at the step 409 has shown that the previous bandwidth reservation is no longer adequate. The interconnection device 110 then makes a bandwidth reservation equal to the sum of the effective rate BWc measured for said critical data stream and the margin bandwidth BWm, preferably within the limit of a predefined maximum bound BWmax for said critical data stream. The predefined maximum bound BWmax is for example predefined according to the type of service (e.g. VoIP, TV, data) with which said critical data stream is associated. Then the step 402 is reiterated.

It should be noted that, if a critical data stream is known to the interconnection device 110 prior to its transit via the interconnection device 110 (e.g. by configuration or by analysis of prior protocol messages), then the initial bandwidth reservation for said critical data stream may be equal to the sum of a rate BWp expected for said critical data stream (e.g. as appearing in said configuration or in said prior protocol messages), and the margin bandwidth BWm, preferably within the limit of the maximum bound BWmax predefined for said critical data stream.

Figure 5:
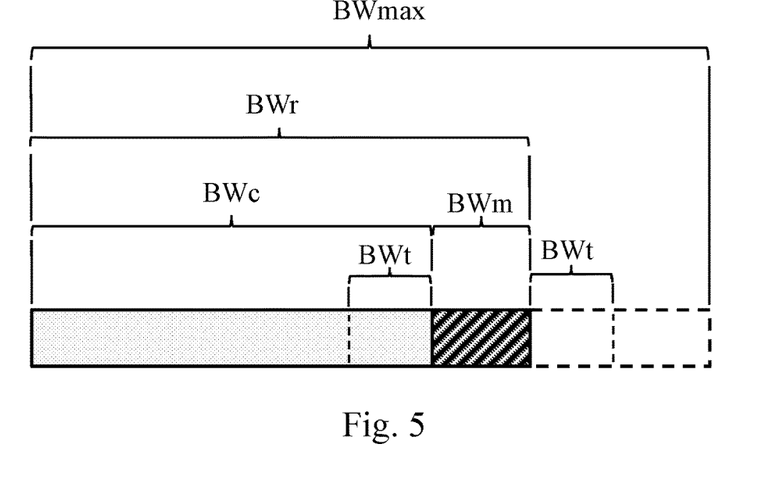
FIG. 5 illustrates schematically a bandwidth reservation following the execution of the algorithm in FIG. 3 or of the algorithm in FIG. 4.

FIG. 5 illustrates schematically a bandwidth reservation following execution of the algorithm in FIG. 3 or of the algorithm in FIG. 4.

The effective rate BWc measured for said critical data stream appears on the schematic representation in FIG. 5. The bandwidth BWr reserved for said critical data stream is therefore the sum of the effective rate BWc plus the margin bandwidth BWm. The margin bandwidth BWm appears hatched on the representation in FIG. 5. The margin bandwidth BWm appears on each side of the margin bandwidth BWm: two thresholds are thus defined: a minimum threshold (BWr−BWm−BWt) below which a future measurement of the effective rate of said critical data stream implies a bandwidth reservation decrease, and a maximum threshold (BWr+BWt) beyond which a future measurement of the effective rate of said critical data stream implies a bandwidth reservation increase.

The algorithms in FIGS. 3 and 4 have been described in the context of a monitoring common to all the critical data streams that pass between the first 101 and second 102 communication networks via the interconnection device 110. Such a monitoring mechanism may however be implemented independently for each critical data stream to be monitored (the step 408 of the algorithm in FIG. 4 then being omitted). In this case, the frequency at which the monitoring mechanism is activated may be adjusted independently for each critical data stream that passes between the first 101 and second 102 communication networks via the interconnection device 110.

Figure 6:
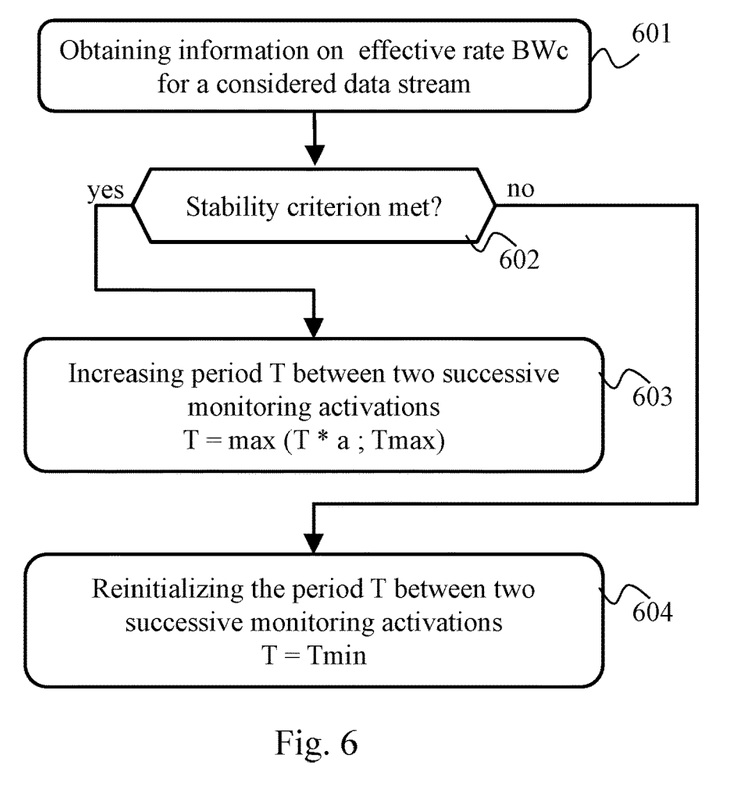
FIG. 6 illustrates schematically an algorithm, implemented by the interconnection device, for defining duration of a period between two successive activations of a monitoring mechanism monitoring effective rate vis-à-vis each said data stream.

FIG. 6 illustrates schematically an algorithm, implemented by the interconnection device 110, for defining the duration of a period T between two successive activations of the monitoring mechanism for a critical data stream that passes via said interconnection device 110. The algorithm in FIG. 6 is preferably executed at the end of the execution of the algorithm in FIG. 3 or of the one in FIG. 4.

In a step 601, the interconnection device 110 obtains information on the effective rate BWc of said critical data stream. This information results from the measurement performed at step 302 or at step 409, at least during the previous execution of the monitoring mechanism (i.e. of the algorithm in FIG. 3 or of the one in FIG. 4).

In a following step 602, the interconnection device 110 checks whether a criterion of stability of the effective rate BWc of said critical data stream is met. According to a particular embodiment, said stability criterion is met when each measurement of effective rate BWc of said critical data stream during the last N executions (N≥1) is lower than the reserved bandwidth BWr and higher than the reserved bandwidth BWr from which the margin bandwidth BWm is subtracted (BWr−BWm), provided that said reserved bandwidth BWr has not been adjusted during said previous N executions of the monitoring mechanism (i.e. of the algorithm in FIG. 3 or of the one in FIG. 4) for said critical data stream. According to another particular embodiment, said stability criterion is met when said reserved bandwidth BWr has not been adjusted during said last N executions of the monitoring mechanism (i.e. of the algorithm in FIG. 3 or of the one in FIG. 4) for said critical data stream. In the case where the criterion of stability of the effective rate BWc of said critical data stream is met, a step 503 is performed; otherwise a step 504 is performed.

In the step 503, the period T between two successive activations of the monitoring mechanism for said critical data stream is increased, within the limit of a predefined maximum bound Tmax. Said period T may be increased by a predefined incremental step, within the limit of said predefined maximum bound Tmax. In a preferential embodiment, said period T is increased by a certain percentage (factor "a") of the value of said period T before increase, within the limit of the predefined maximum bound Tmax. For example, said period T is doubled.

In the step 503, the period T between two successive activations of the monitoring mechanism for said critical data stream is decreased. Said period T may be decreased by a predefined decrement step, within the limit of a predefined minimum bound Tmin. In a preferential embodiment, said period T is reinitialised to the value of the predefined minimum bound Tmin.

At the moment when a new critical data stream to be monitored is detected by the interconnection device 110, the period T between two successive activations of the monitoring mechanism for said critical data stream is preferably fixed at the value of the predefined minimum bound Tmin, but could also be fixed at the value of the predefined maximum bound Tmax (starting from the principle that the critical data stream does not significantly change in terms of rate when said critical data stream has just been established) or at an intermediate value between the predefined minimum bound Tmin and the predefined maximum bound Tmax.

The invention claimed is:

1. A bandwidth management method implemented by an interconnection device for interconnecting between a first communication network and a second communication network, critical data streams and non-critical data streams passing between the first and second communication networks via said interconnection device, the critical data streams having, unlike the non-critical data streams, a bandwidth reservation requirement in order to ensure rate and latency constraints, wherein the interconnection device implements a monitoring mechanism for monitoring the critical data streams passing between the first and second communication networks via said interconnection device so that, for each critical data stream passing between the first and second communication networks via said interconnection device, said interconnection device performs:
- measuring an effective rate of said critical data stream;
- performing a first check comprising checking whether said measured effective rate is higher than the sum of a bandwidth previously reserved for said critical data stream and a tolerance bandwidth;
- performing a second check comprising checking whether said effective rate measured is lower than the bandwidth previously reserved for said critical data stream, from which the sum of a margin bandwidth and the tolerance bandwidth is deducted; and
- in response to (1) the first check resulting in determining the measured effective rate is higher than the sum of the bandwidth previously reserved for said critical data stream and the tolerance bandwidth or (2) the second check resulting in determining the effective rate measured is lower than the bandwidth previously reserved for said critical data stream, adjusting bandwidth reservation for said critical data stream to a value equal to the sum of the measured effective rate for said critical data stream and the margin bandwidth.

2. The bandwidth management method according to claim 1, wherein the bandwidth reservation for said critical data stream is adjusted within the limit of a maximum bound associated with said critical data stream.

3. The bandwidth management method according to claim 1, wherein said interconnection device activates said monitoring mechanism, for all said critical data streams passing between the first and second communication networks via said interconnection device, periodically.

4. The bandwidth management method according to any claim 1, wherein said interconnection device defines dynamically, for each critical data stream passing between the first and second communication networks via said interconnection device, a period of time between two successive activations of the monitoring mechanism by:
- checking if a criterion of stability of the effective rate of said critical data stream is complied with;
- in the event of meeting said stability criterion, increasing the period of time between two successive activations of the monitoring mechanism for said critical data stream; and,
- in the event of not meeting said stability criterion, decreasing the period of time between two successive activations of the monitoring mechanism for said critical data stream.

5. The bandwidth management method according to claim 4, wherein, in the event of not meeting said stability criterion, said period of time between two successive activations of the monitoring mechanism for said critical data stream is reinitialised to a predefined minimum bound value.

6. The bandwidth management method according to claim 4, wherein said stability criterion is met when each measurement of effective rate of said critical data stream during the last N executions of the monitoring mechanism, $N \geq 1$, is less than the reserved bandwidth, provided that said reserved bandwidth has not been adjusted during said previous N executions of the monitoring mechanism for said critical data stream.

7. The bandwidth management method according to claim 4, wherein said stability criterion is met when said reserved bandwidth has not been adjusted during said last N executions, $N \geq 1$, of the monitoring mechanism for said critical data stream.

8. A non-transitory information storage means storing a computer program comprising instructions for implementation, by a processor of said interconnection device for interconnecting between the first communication network and the second communication network, of the method according to claim 1 when said program is executed by said processor.

9. An interconnection device for interconnecting between a first communication network and a second communication network, critical data streams and non-critical data streams passing between the first and second communication networks via said interconnection device, the critical data streams having, unlike the non-critical data streams, a bandwidth reservation requirement in order to ensure rate and latency constraints, wherein the interconnection device implements a monitoring mechanism for monitoring the critical data streams passing between the first and second communication networks via said interconnection device so that, for each critical data stream passing between the first and second communication networks via said interconnection device, said interconnection device comprises:
- a processor that is configured to perform:
  - measuring an effective rate of said critical data stream;
  - performing a first check comprising checking whether said measured effective rate is higher than the sum of a bandwidth previously reserved for said critical data stream and a tolerance bandwidth;
  - performing a second check comprising checking whether said measured effective rate is lower than the bandwidth previously reserved for said critical data stream, from which the sum of a margin bandwidth and a tolerance bandwidth is deducted; and,
  - in response to (1) the first check resulting in determining the measured effective rate is higher than the sum of the bandwidth previously reserved for said critical data stream and the tolerance bandwidth or (2) the second check resulting in determining the effective rate measured is lower than the bandwidth previously reserved for said critical data stream, adjusting bandwidth reservation for said critical data stream to a value equal to the sum of the measured effective rate for said critical data stream and the margin bandwidth.

* * * * *